United States Patent
Miller et al.

(10) Patent No.: US 9,756,792 B2
(45) Date of Patent: Sep. 12, 2017

(54) FLOATING GARDEN STRUCTURE

(71) Applicants: Kenneth C. Miller, Kalkaska, MI (US); Carol L. Miller, Kalkaska, MI (US)

(72) Inventors: Kenneth C. Miller, Kalkaska, MI (US); Carol L. Miller, Kalkaska, MI (US)

(*) Notice: Subject to any disclaimer, the term of this patent is extended or adjusted under 35 U.S.C. 154(b) by 127 days.

(21) Appl. No.: 14/732,242

(22) Filed: Jun. 5, 2015

(65) Prior Publication Data

US 2016/0353673 A1 Dec. 8, 2016

(51) Int. Cl.
| A01G 25/00 | (2006.01) |
| A01G 9/02 | (2006.01) |
| A01G 9/10 | (2006.01) |

(52) U.S. Cl.
CPC ............. *A01G 9/02* (2013.01); *A01G 9/1066* (2013.01)

(58) Field of Classification Search
CPC .... A01G 9/02; A01G 31/00; A01G 2031/003; A01G 2031/005; A01G 31/02; A01G 9/10
USPC ........................................................ 220/560
See application file for complete search history.

(56) References Cited

U.S. PATENT DOCUMENTS

| 2,175,113 A * | 10/1939 | Fischer | A01C 1/02 47/14 |
| 3,182,340 A * | 5/1965 | Gentile | B63C 9/02 441/32 |
| 4,355,484 A * | 10/1982 | Mandish | A01G 31/02 47/63 |
| 4,513,533 A * | 4/1985 | Gething | A01G 31/045 47/63 |
| 4,622,775 A * | 11/1986 | Glenn | A01G 31/02 47/63 |
| 4,887,716 A * | 12/1989 | Abraham | A47K 3/004 206/139 |
| 6,086,755 A * | 7/2000 | Tepper | C02F 3/327 119/260 |
| 6,786,002 B2 * | 9/2004 | Prescott | A01G 9/02 47/65.5 |
| 6,843,021 B1 * | 1/2005 | Huang | A01G 9/00 47/60 |
| 7,320,197 B2 * | 1/2008 | Meyer | A01G 27/04 47/59 R |
| 7,448,163 B2 * | 11/2008 | Beeman | A01G 9/00 47/60 |

(Continued)

OTHER PUBLICATIONS

Miller, Floating Flower Gardens, advertising sheet, 2015 (referencing 2011 floating garden pictured top left photo), 1 page, North Blue Enterprises LLC, US.

*Primary Examiner* — Kristen C Hayes
(74) *Attorney, Agent, or Firm* — Northern Michigan Patent Law, PLC

(57) ABSTRACT

A floating garden for individually potted plants, comprising a buoyant body with a plurality of through-bores extending from the top to the bottom surfaces, the through-bores adapted to receive potted plants and potting soil. Each through-bore comprises a larger diameter upper portion and a smaller diameter lower portion aligned with each other, and a netting cup in the lower portion extending adjacent the bottom surface of the buoyant body. The netting cup holds a wicking material such as peat moss in the lower portion of the through-bore, while the upper portion of the through-bore holds potting soil and the plant.

9 Claims, 5 Drawing Sheets

(56) References Cited

U.S. PATENT DOCUMENTS

| | | | |
|---|---|---|---|
| 7,784,218 B2* | 8/2010 | Kania | A01G 9/00 47/65.5 |
| 7,941,970 B2* | 5/2011 | Kania | A01G 9/00 47/59 S |
| 8,250,808 B2* | 8/2012 | Kania | A01G 31/00 47/59 S |
| 8,327,579 B2* | 12/2012 | Kania | A01G 31/00 47/59 R |
| 9,357,714 B2* | 6/2016 | Van Der Knaap | A01G 9/00 |
| 2003/0070357 A1* | 4/2003 | Huang | A01G 9/00 47/66.3 |
| 2003/0110688 A1* | 6/2003 | Prescott | A01G 9/02 47/65.5 |
| 2003/0208954 A1* | 11/2003 | Bulk | A01K 63/006 47/39 |
| 2007/0017153 A1* | 1/2007 | Meyer | A01G 27/04 47/87 |
| 2009/0139927 A1* | 6/2009 | Kania | A01G 31/00 210/602 |
| 2010/0088956 A1* | 4/2010 | Kania | A01G 9/00 47/65.5 |
| 2011/0005133 A1* | 1/2011 | Kania | A01G 31/00 47/59 R |
| 2011/0214347 A1* | 9/2011 | Zhang | A01G 31/02 47/60 |
| 2012/0055086 A1* | 3/2012 | Van Der Knaap | A01G 9/00 47/59 R |

* cited by examiner

FLOATING GARDEN STRUCTURE

RELATED APPLICATIONS/PRIORITY BENEFIT CLAIM

Not applicable.

FIELD

The subject matter of the present application is in the field of artificial garden and plant beds used in water.

BACKGROUND

Floating gardens are known, for example at the Epcot Center, Disney World, in Florida.

We have previously invented a floating garden structure for floating individually potted plants on the surface of a body of water such as a pond. The structure had a floating foam base with multiple through-bores from the top surface to the bottom surface, and potted plants were secured therein with a netting material so that their roots could grow through into the water. The upper and outer side surfaces of the structure were decorated with synthetic furnace filter material.

Problems with our earlier floating garden structure included a lack of durability and natural appearance in the outer covering; a tendency for the potted plant soil in the bores to be over-moist or flooded; and a tendency for the netting material to be difficult to install, to interfere with the potting of the plants in the bores, and to become detached from the bores over time.

Another problem with our earlier floating garden was that by riding high enough in the water to reduce the tendency of the potting soil in the bores to become flooded, turtles and other amphibians were unable to climb onto the structure.

BRIEF SUMMARY

We have invented an improved floating garden structure that reduces or eliminates the above problems.

Our improved floating garden structure comprises a buoyant body, for example made from foam; a coconut matting (or equivalent) natural outer covering on the upper and side surfaces of the foam body; dual-diameter through-bores in the foam body, each through-bore comprising a larger diameter upper portion and a smaller diameter lower portion aligned with the upper portion; a netting "cup" in the lower smaller diameter portion of the through-bore, with a lower end of the netting cup located adjacent the bottom surface of the foam body in order to be at or below the waterline.

In a further form, wicking peat moss (or wicking equivalent) is contained in the netting cup in the smaller diameter lower portion of the through-bore, while potting soil (or equivalent plant growing medium) is contained in the larger diameter upper portion of the through-bore above the moss.

In a further form, the netting cup is secured in the lower portion of the through-bore without any edges exposed in the bore. By way of preferred example, the foam body is formed in two layers, an upper layer including the upper portion of the through-bore and a lower layer including the lower portion of the through-bore. The netting is formed as a soft cup with an upper diameter larger than the diameter of both the lower and upper portions of the through-bore, the upper diameter of the netting forming a lip or shelf of material overlying an upper face of the lower layer of the foam body, and secured in place between the upper and lower layers with its edge(s) secured between the layers radially outside the through-bore.

The netting may further be made from a wicking material such as burlap, such that it wicks water to the bottom surface of the potting soil "plug" in the upper portion of the through-bore.

The upper surface of the floating garden structure may be tapered toward the waterline around edge portions of the buoyant body when the garden is loaded with plants and is floating, such that small amphibians can crawl up out of the water onto the upper surface of the garden to sun themselves.

These and other features and advantages of the invention will become apparent from the detailed description below, in light of the accompanying drawings.

DETAILED DESCRIPTION

Figure 1:
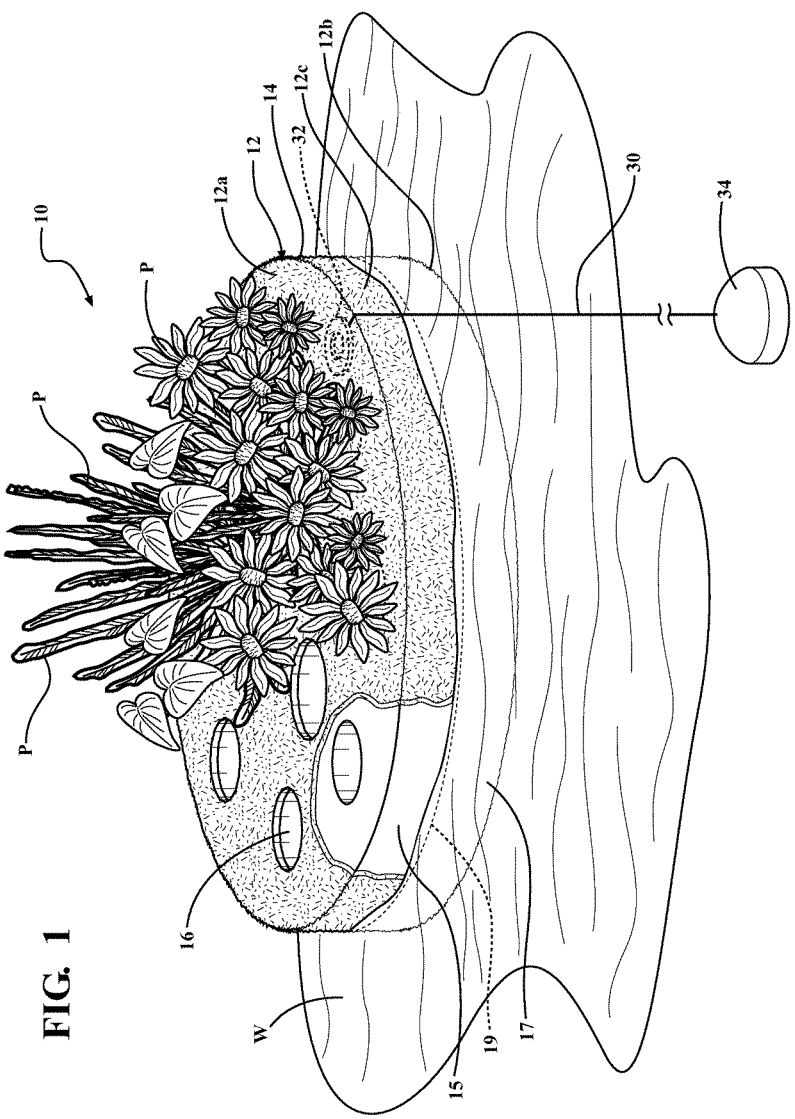
FIG. 1 is a perspective top view of a floating garden structure according to the invention, floating in water.
Figure 2:
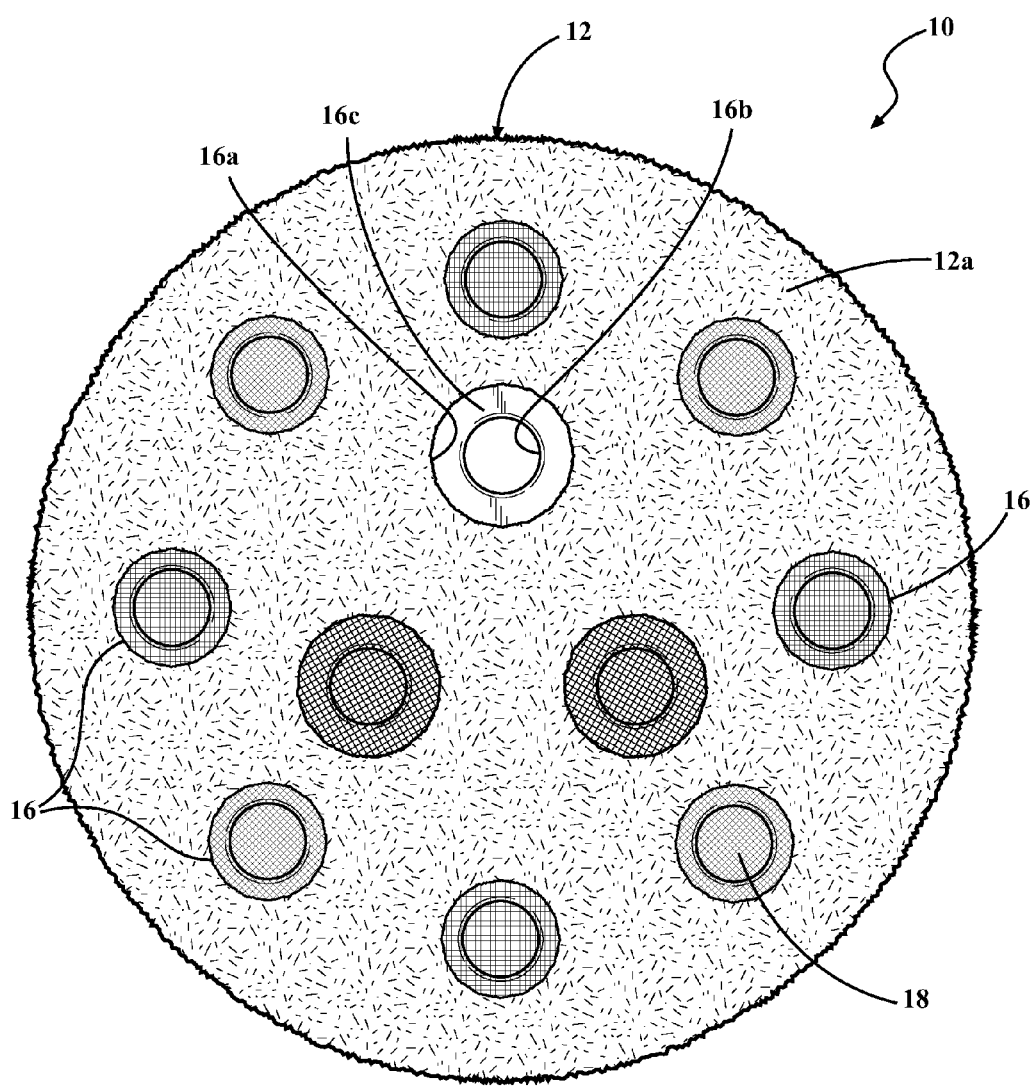
FIG. 2 is a top plan view of the floating garden structure of claim 1.

Referring to FIGS. 1 through 4, a floating garden structure 10 is shown in exemplary form in order to teach how to make and use the claimed invention. Floating garden structure 10 has a buoyant body 12, in the illustrated example made from a foam such as (but not limited to) polystyrene, although other buoyant materials could be used, for example hollow plastic moldings, lightweight wood, and other materials known to those skilled in the art. Buoyant body 12 is shown with a circular or disc shape having top and bottom surfaces 12a and 12b and a side surface 12c, but it should be understood that the body is not limited to a circular shape or any other shape. Top and bottom surfaces may be substantially flat as shown, or may include surface variations in height, sculpted features, etc.

Body 12 is further shown covered with a natural, water- and weather-resistant outer layer 14, in the illustrated example a coconut matting of the type commonly used in porch welcome mats, or found at garden supply centers and used to line flower baskets. Equivalent matting or covering materials are possible, but coconut matting is highly preferred, in that it is a natural material and looks attractive, it absorbs water without deteriorating, and it dries slowly enough to help cool the upper surface of the garden in sunny weather.

Buoyant body 12 includes one or more potting through-bores 16 for individually potting a variety of plants P. Through-bores 16 extend through body 12, opening onto the top surface 12a and the bottom surface 12b, with the lower ends of the through-bores exposed directly to, and usually submerged in, the body of water W in which the garden structure floats. Each through-bore 16 includes a larger diameter upper portion 16a and a smaller diameter lower portion 16b, preferably cylindrical although not limited to cylindrical shapes. Upper portion 16a and lower portion 16b are aligned, and preferably also concentric. Through-bores 16 may be formed through body 12 in any known manner, for example by boring or cutting them into the body in single or multiple steps, or by molding them integrally therewith, depending on the material and manufacturing technique used to make the buoyant body.

Figure 3:
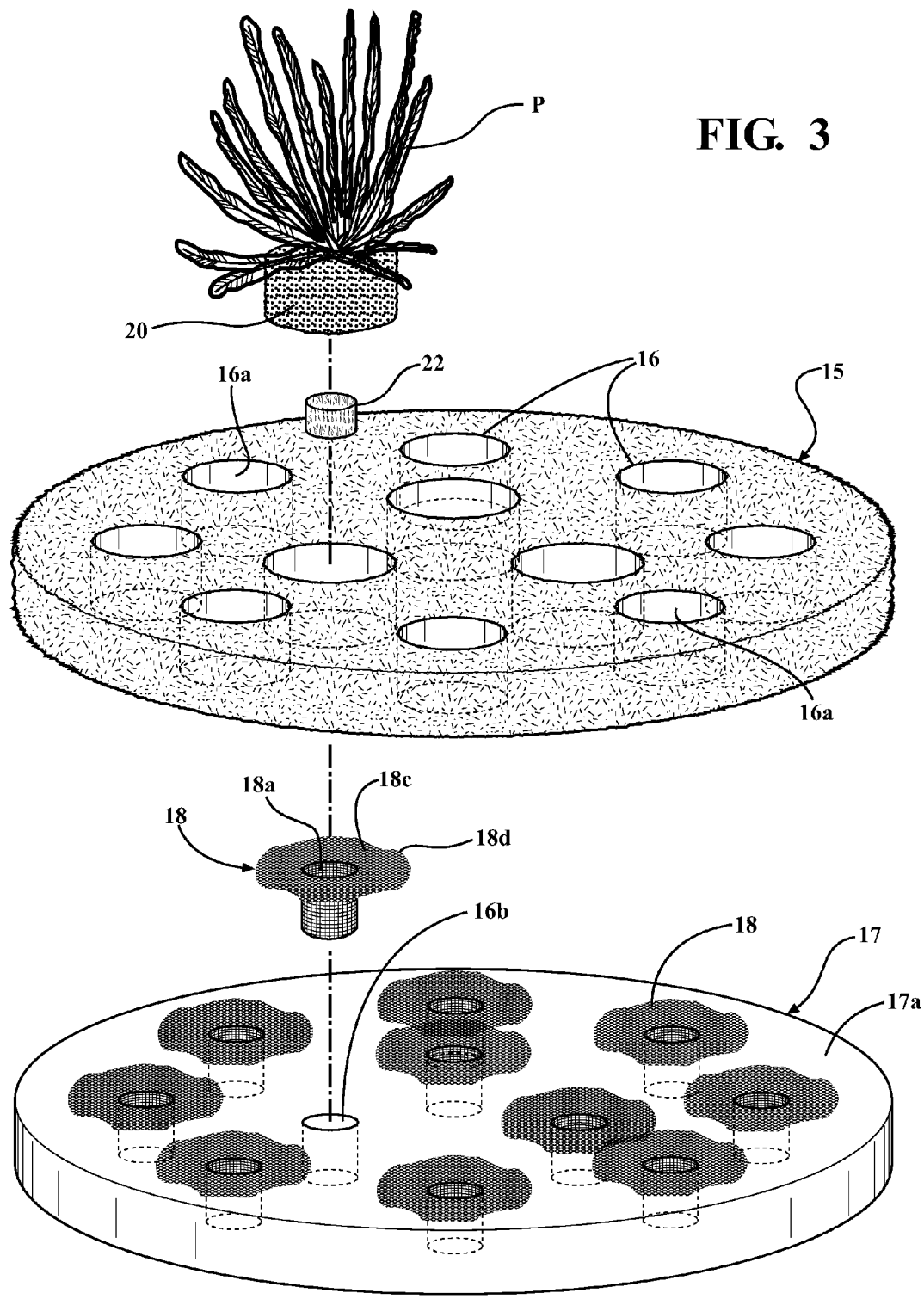
FIG. 3 is an exploded perspective view of the floating garden structure of claim 1.

In the illustrated example of FIGS. 1-4, and as best shown in FIG. 3, buoyant body 12 is made in two sections assembled into a single unit: an upper layer 15 and a lower layer 17, both made from discs of foam approximately two to three inches thick, with an interface 19 where they are joined. The upper portion 16a of each through-bore is formed in upper layer 15, while the lower portion 16b of each through-bore is formed in lower layer 17. When the upper and lower layers are assembled into a unitary buoyant body 12, for example using a waterproof adhesive, mechanical fasteners, etc. at interface 19, a potting shelf 16c is formed by the upper face of lower layer 17. The potting shelf marks the lower end of the upper through-bore portion 16a.

Each through-bore 16 is provided with a netting or mesh cup 18 in its lower portion 16b. Netting cup 18 includes an open upper end 18a terminating at potting shelf 16c, and closed lower end 18b terminating at or near the bottom surface 12b of the buoyant body 12. In the illustrated example, netting cup 18 also includes radially extended lip or flange(s) 18c extending at least partway across potting shelf 16c, and preferably fully across and terminating at outer edge(s) 18d in interface 19 between upper and lower foam layers 15 and 17, radially outward of the upper potting portion 16a of the through-bore. In this example, flange 18c of the netting cup can be secured to the upper surface 17a of lower foam layer 17, for example with adhesive and/or staples, prior to assembly of the two foam layers, such that the outer end 18d of the netting is secured between the layers upon assembly. This construction also provides a layer of the netting along the surface of potting shelf 16c. If netting cup 18 is made from a moisture-wicking material such as burlap, for example, then the netting provides a steady, controlled supply of water wicked from pond W to the potting portion of the plant in through-bore 16.

Figure 4:
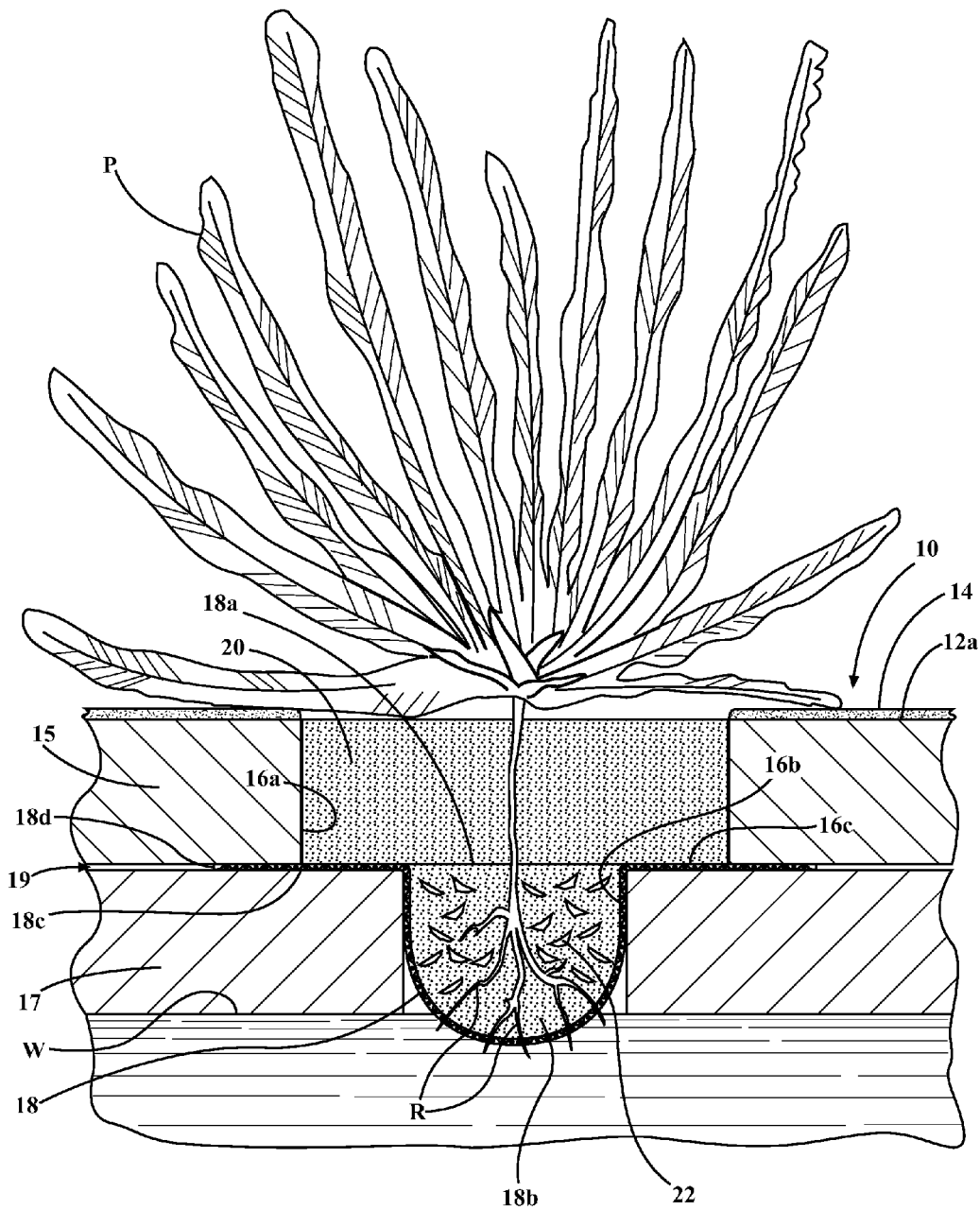
FIG. 4 is a side section view of one of the plant bores of the floating garden structure of claim 1.

Referring next to FIG. 4, one of the through-bores 16 is shown in section, with a plant P potted in the bore. Upper portion 16a of the through-bore contains a potting soil or mix 20 of known type and composition suitable for growing and supporting the plant. Lower portion 16b of the through-bore contains a wicking peat moss 22 or equivalent, for example sphagnum peat moss, that helps draw water from pond W in a controlled manner up to the plant roots R and the potting soil 20, keeping them moist even though the waterline W is below the potting soil and the bulk of the roots. Peat moss 22 acts as a water-regulating buffer between pond W and the potted soil/plant, reducing the likelihood of the soil becoming waterlogged and the plant overwatered. While peat moss is currently the best known wicking type material for lower portion 16b of the bore, other materials with a similar function may be possible.

Figure 5:
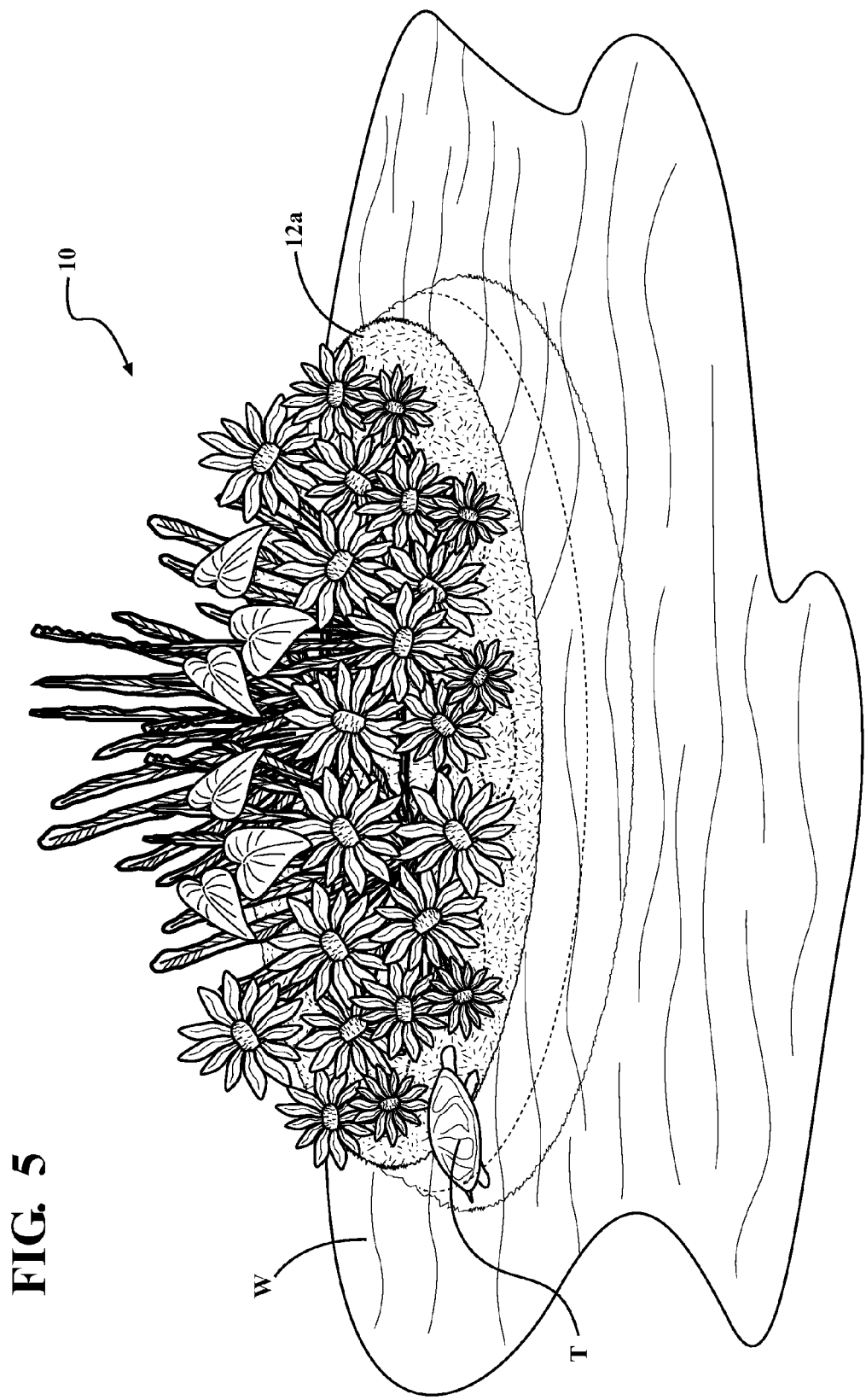
FIG. 5 is similar to FIG. 1, but shows an alternate embodiment in which the upper surface of the structure is tapered to the waterline.

Referring now to FIG. 5, a variation on the buoyant body is shown, in which at least a portion, and optionally the entire, upper surface 12a is tapered down toward the waterline W, close enough that small amphibians such as turtles can climb onto floating garden 10 to sun themselves. The natural, fibrous texture of coconut matting cover 14 provides good, safe traction for such creatures to assist their climbing onto the garden.

Floating garden 10 may be anchored in place, especially if used in a large, open body of water, using a line 30 connected to the buoyant body 12 with a suitable connector 32 at its upper end, and to an anchor 34 at its lower end. Such an arrangement is shown in FIG. 1, with the anchor structure offset to the side for better visibility; the anchor may also go through the center of the garden, which is preferred.

Description of Operation

In operation, the floating garden is used by substantially filling each of the netting cups 18 in through-bores 16 with peat moss 22, and then potting a plant P with its soil mix 20 in each of the upper portions of the through-bores 16, above and in wicking contact with the peat moss 22 and the uppermost flange of the netting 18. The garden 10 may then be floated in the body of water W for as long as desired, often for the entire garden season with minimal attention due to the self-watering nature of the garden. It has been found that the roots R of the plants P will often grow down through the peat moss and the spaces in netting 18 into water W, which surprisingly does not seem to result in overwatering of the plant.

It will be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A floating garden apparatus for floating one or more individually potted plants on a body of water, comprising:
   a buoyant body comprising a top surface, one or more side surfaces, and a bottom surface;
   at least one dual-diameter through-bore in the buoyant body, the through-bore comprising a larger diameter upper portion and a smaller diameter lower portion aligned with the upper portion;
   a netting cup secured in the lower portion of the through-bore, with a lower end of the netting cup located adjacent the bottom surface of the buoyant body, and further comprising a wicking material in the netting cup, the wicking material substantially contained in the lower portion of the through-bore.

2. The floating garden apparatus of claim 1, further comprising a coconut matting covering on the upper and side surfaces of the buoyant body.

3. The floating garden apparatus of claim 1, further comprising a potting soil substantially contained in the upper portion of the through-bore.

4. The floating garden apparatus of claim 3, wherein the netting is made from a moisture-wicking material and includes an upper end in contact with the potting soil in the upper portion of the through-bore.

5. The floating garden apparatus of claim 4, wherein the lower end of the upper portion of the through-bore is defined by a potting shelf having a greater diameter than the lower portion of the through-bore, and further wherein the upper end of the netting forms a radial flange extending at least partway across the potting shelf to provide a layer of the netting along a surface of the potting shelf.

6. The floating garden apparatus of claim 5, wherein the larger diameter of the upper portion of the through-bore is a first constant diameter, and wherein the smaller diameter of the lower portion of the through-bore is a second constant diameter.

7. The floating garden apparatus of claim 1, wherein the buoyant body comprises an upper layer including the upper portion of the through-bore and a lower layer including the lower portion of the through-bore, the upper and lower layers formed separately and joined to define an interface, and further wherein the netting cup is formed with an upper diameter larger than the diameter of both the lower and upper portions of the through-bore, the upper diameter of the netting forming a radial flange overlying an upper face of the lower layer of the buoyant body and secured at an edge portion at the interface between the upper and lower layers radially outside the upper portion of the through-bore.

8. The floating garden apparatus of claim 7, wherein the netting is made from a moisture-wicking material.

9. The floating garden apparatus of claim 1, wherein the top surface of the buoyant body is tapered downwardly at an edge portion thereof to a point adjacent a buoyant waterline on the side surface of the buoyant body.

\* \* \* \* \*